United States Patent [19]

Thomas

[11] 3,721,777

[45] March 20, 1973

[54] ECHO PATH DELAY SIMULATOR FOR USE WITH ADAPTIVE ECHO CANCELLERS

[75] Inventor: Edmond Joseph Thomas, New Shrewsbury, N.J.

[73] Assignee: Bell Telephone Laboratories, Incorporated, Murray Hill, N.J.

[22] Filed: Nov. 26, 1971

[21] Appl. No.: 202,338

[52] U.S. Cl. ....................179/170.2
[51] Int. Cl. ....................H04b 3/20
[58] Field of Search ....................179/170.2, 170.8

[56] References Cited

UNITED STATES PATENTS

| | | | |
|---|---|---|---|
| 3,588,385 | 6/1971 | Moye | 179/170.2 |
| 3,535,473 | 10/1970 | Flanagan et al. | 179/170.2 |
| 3,500,000 | 3/1970 | Kelly et al. | 179/170.2 |
| 3,422,232 | 1/1969 | Brady | 179/170.8 |

*Primary Examiner*—Kathleen H. Claffy
*Assistant Examiner*—Alan Faber
*Attorney*—R. J. Guenther et al.

[57] ABSTRACT

The echo path of a four-to-two wire junction is bridged by a variable delay device and an adaptive echo canceller connected in series. If the variable delay device is controlled so as to provide a delay to an incoming signal equal to the echo path delay, the number of taps required in the echo canceller can be reduced and the stability of the canceller thereby improved. To this end, a delay measuring circuit serves to form the cross-correlation function between the incoming or echo generating signal and the echo. The point at which this cross-correlation function is first determined to be a maximum corresponds to the echo path delay. The determination is then used to control the variable delay device so as to achieve a delay therein substantially equal to the echo path delay.

8 Claims, 5 Drawing Figures

ECHO PATH DELAY SIMULATOR FOR USE WITH ADAPTIVE ECHO CANCELLERS

BACKGROUND OF THE INVENTION

This invention relates to the cancellation of echoes in communication circuits and more particularly to means for simulating the echo path delay in such circuits.

A novel approach has been presented for echo cancellation in long distance telephone and communication circuits; see the article "An Adaptive Echo Caneeller" by M. M. Sondhi, The Bell System Technical Journal of March, 1967, Vol. 46, No. 3, pages 497–511, and U.S. Pat. No. 3,500,000 to J. L. Kelly, Jr. and B. F. Logan, Jr., issued Mar. 10, 1970. In contrast with conventional echo suppressors, this new apparatus achieves echo cancellation without interrupting the return signal path. A replica of the echo is synthesized and subtracted from the return signal. The replica is synthesized by means of a transversal filter which, under the control of a feedback loop, adapts to the transmission characteristic of the echo path and tracks variations in the same which may arise during a conversation. The new echo cancellation apparatus has been aptly termed a transversal filter adaptive echo canceller.

Now as noted by Sondhi (see page 510 of the above-cited article) and others, for proper operation of an adaptive echo canceller the delay between the input signal to an echo path and the return echo must be compensated for. This delay can prove to be quite large (e.g., 40 milliseconds). As stated by Sondhi, "The problem of automatically determining this delay and compensating for it is a challenging problem...." The problem is complicated by the fact that the echo path delay may vary substantially from connection to connection.

It is a primary object of the present invention therefore to automatically determine and compensate for the echo path delay in telephone and communication circuits.

Perhaps the most obvious solution to this echo path delay problem, and the one typically proposed for use in adaptive echo cancellers, is to provide a transversal filter tapped delay line of a length at least equal in delay duration to the anticipated impulse response duration (e.g., 10–15 msec.) plus the echo path delay (e.g., 40 msec.). Unfortunately, for a tap delay (i.e., the delay between taps) equal to the Nyquist interval (e.g., 0.1 msec.) it is evident that the number of delay line taps is multitudinous, and the multipliers and integrators associated with said taps excessive in number and in cost. In addition, an adaptive echo canceller's instability and noise are increased as the number of its transversal filter delay line taps is increased.

Accordingly, it is a further object of the present invention to reduce the number of taps required in an adaptive echo canceller to provide a given suppression.

A still further and related object of the invention is to improve the stability and noise performance of an adaptive echo canceller by reducing the number of its transversal filter delay line taps.

SUMMARY OF THE INVENTION

In accordance with the present invention a variable delay device and an adaptive echo canceller are connected in series across the echo path of a four-to-two wire junction. It should be intuitively clear that if an incoming signal can be delayed in said variable delay device by an amount equal to the echo path delay, the number of taps required in the adaptive echo canceller can be significantly reduced and the operation thereof substantially improved. To this end, a delay measuring circuit serves to form the cross-correlation function between the incoming or echo generating signal and the echo. The point at which this cross-correlation function is first determined to be a maximum corresponds to the round-trip or echo path delay. The determination is then used to control the variable delay device so as to arrive at the desired delay.

In a preferred form of the invention, the delay measuring circuit comprises a tapped delay line having a plurality of taps, with a delay between taps equal to the Nyquist interval. The incoming signal in the input path is delivered to the tapped delay line and the delayed signals at the respective taps of the latter are multiplied, in respective multiplier networks, with the echo signal in the return signal path. The product signals from the multiplier networks are each averaged in respective integrator circuits and the averaged signals are then compared to determine the maximum of the averaged products. This maximum is indicative of the echo path delay and it can be utilized, in a straightforward manner, to control the variable delay device so as to achieve a delay therein substantially equal to the echo path delay.

BRIEF DESCRIPTION OF THE DRAWINGS

The invention will be more fully appreciated from the following detailed description when considered in connection with the accompanying drawings in which.

DETAILED DESCRIPTION

Figure 1:
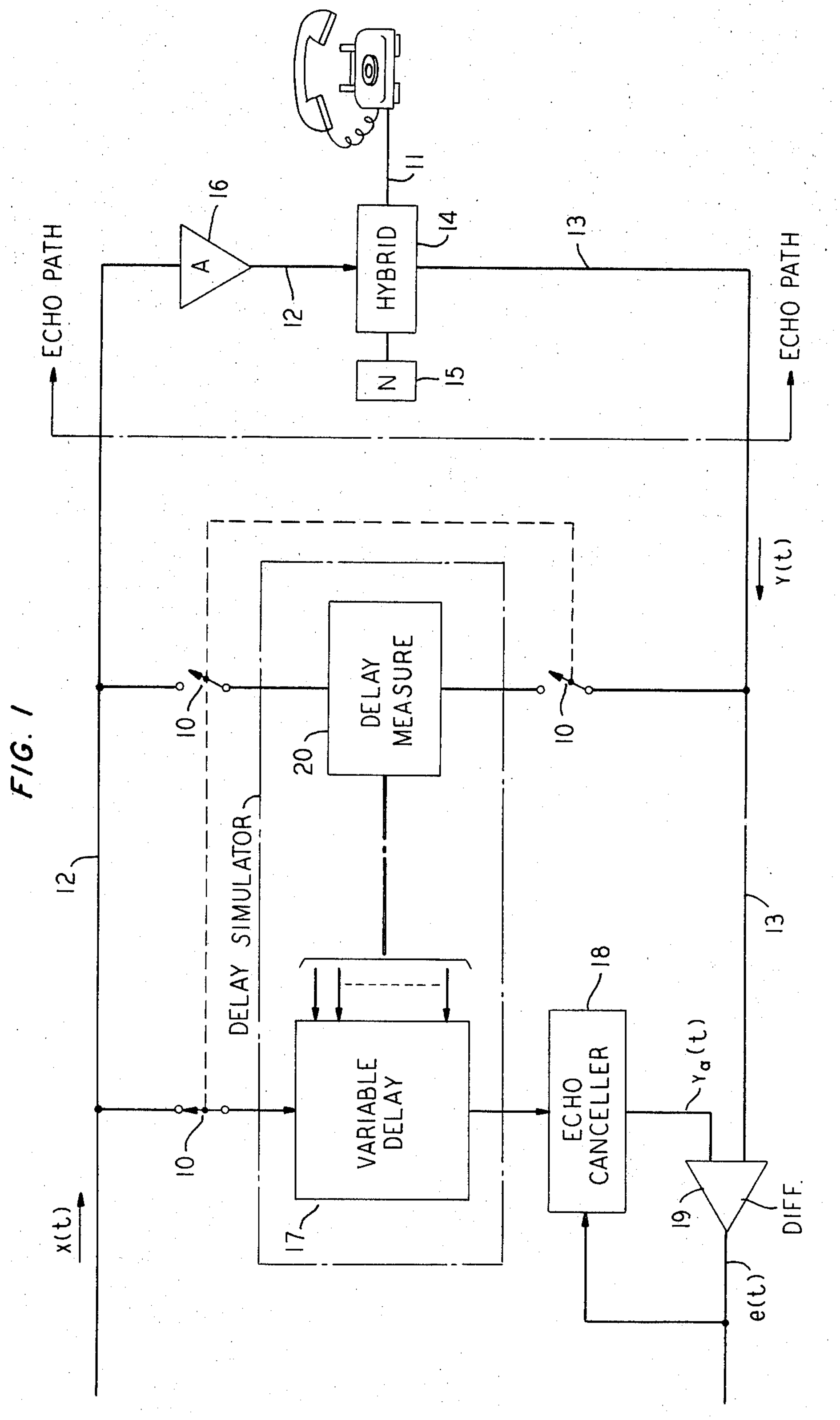
FIG. 1 is a schematic block diagram of echo cancellation apparatus constructed in accordance with the present invention.

Referring now to FIG. 1 of the drawings, a single transmission terminal is shown for interconnecting a single two-way circuit 11 with two one-way circuits 12 and 13. Local circuit 11 typically is a conventional two-wire telephone circuit connecting a subscriber to circuits 12 and 13 by way of hybrid network 14. The impedance of local circuit 11 is matched insofar as possible by balancing network 15 associated with hybrid 14. Ideally, all incoming signals received from circuit 12 are delivered by way of isolating amplifier 16 and hybrid 14 to local circuit 11. None of this energy should be transferred to outgoing circuit 13. Similarly, all of the energy reaching hybrid 14 from local circuit 11 should be delivered to the outgoing circuit 13. Unfortunately, the balancing network 15 generally provides only a partial match to the two-wire circuit so that a portion of the incoming signal (from circuit 12) reaches the outgoing circuit 13. In the absence of adequate suppression or cancellation of this signal component, or echo, the signal accompanies outgoing signals which originated in circuit 11 and are delivered over the outgoing circuit 13 to a remote station or terminal. Upon reaching the distant station this signal, which originated there in the first place, is perceived as an echo. Accordingly, echo suppression or cancellation apparatus is typically employed to eliminate this return echo signal.

The variable delay device 17, to be described hereinafter, serves to couple an incoming signal $x(t)$ in the input path 12 to the adaptive echo canceller 18. The echo canceller 18 employs a transversal filter (not shown) to which the input signal is delivered and a feedback control loop (not shown) which continuously controls the adjustment of the transversal filter so that the filter produces a replica $y_a(t)$ of the undesired echo signal $y(t)$. The replica signal is algebraically subtracted from the signals outgoing in circuit 13 through the action of the difference network 19. The objective here, as with echo cancellers in general, is that the resulting difference $e(t)$ should eventually become small, i.e., that $$e(t) = y(t) - y_a(t) < \epsilon(t)$$

for $$t > T_s$$

where $\epsilon(t)$ depends on the suppression desired and $T_s$ is the settling time of the adaptive echo canceller.

The transversal filter adaptive echo canceller utilized herein is essentially the same as that of the aforementioned Sondhi article and the Kelly-Logan patent and it does not, per se, comprise any part of the present invention. Further, since adaptive echo cancellers have been extensively described in the patent and technical literature, a detailed description of the same at this point does not appear to be warranted. For a generalized, less than rigorous, explanation of a transversal filter adaptive echo canceller see my copending application, Ser. No. 196,038, filed Nov. 5, 1971.

Now if the incoming or echo generating signal $x(t)$ could be delayed in the variable delay device 17 by an amount equal to the echo path delay, the number of taps required in the adaptive echo canceller could be reduced. In this case, the transversal filter tapped delay line, of the adaptive echo canceller, would only have to be of a length equal to the anticipated impulse response duration. Hence, a very significant reduction in the number of taps required in the adaptive echo canceller would be realized. And, as previously pointed out, improved echo canceller performance would be achieved at less cost. Unfortunately, the round-trip or echo path delay varies considerably from telephone circuit to telephone circuit.

In accordance with the present invention, it has been found that the round-trip delay in an echo path can be determined and simulated by forming the cross-correlation function between the echo generating signal and the echo; the point at which this cross-correlation function is first a maximum corresponds to the round-trip delay.

Consider the cross-correlation function $$R_{xy}(\tau) = \lim_{\alpha \to \infty} \frac{1}{\alpha} \int_0^\alpha x(t-\tau) y(t)\, dt \qquad (1)$$

where $x(t)$ is the echo generating signal and $y(t)$ is its echo. Now since the echo in a telephone circuit is highly intelligible, it can be reasonably approximated by merely delaying $x(t)$ and reducing its amplitude. Specifically, it seems that a reasonable first order representation of the echo $y(t)$ may be given by $$y(t) \approx A\, x(t-\Delta) \qquad (2)$$

where $A$ is a constant and $\Delta$ is the echo path round-trip delay. Substituting equation (2) into equation (1), the following is obtained:

$$R_{xy}(\tau) \approx A \lim_{\alpha \to \infty} \frac{1}{\alpha} \int_0^\alpha x(t-\tau) x(t-\Delta)\, dt \qquad (3)$$

It can be shown that the right-hand side of equation (3) is a maximum when $\tau = \Delta$.

To prove that $R_{xy}(\tau)$ is a maximum when $\tau = \Delta$, consider:

$$\lim_{\alpha \to \infty} \frac{1}{\alpha} \int_0^\alpha (x(t-\tau) - x(t-\Delta))^2 dt = \lim_{\alpha \to \infty} \frac{1}{\alpha} \int_0^\alpha x^2(t-\tau)\, dt - 2 \lim_{\alpha \to \infty} \frac{1}{\alpha} \int_0^\alpha (x(t-\tau) x(t-\Delta))\, dt + \lim_{\alpha \to \infty} \frac{1}{\alpha} \int_0^\alpha x^2(t-\Delta)\, dt \geq 0 \qquad (4)$$

But for causal functions and finite positive values of $\Delta$:

$$\lim_{\alpha \to \infty} \frac{1}{\alpha} \int_0^\alpha x^2(t-\tau)\, dt = \lim_{\alpha \to \infty} \frac{1}{\alpha} \int_0^\alpha x^2(t-\Delta)\, dt \qquad (5)$$

Therefore, substituting from equation (5) into equation (4) we get:

$$2 \lim_{\alpha \to \infty} \frac{1}{\alpha} \int_0^\alpha x^2(t-\Delta)\, dt \geq 2 \lim_{\alpha \to \infty} \frac{1}{\alpha} \int_0^\alpha x((t-\tau) x(t-\Delta))\, dt \qquad (6)$$

The two coefficients on both sides of the equation, of course, cancel. From equations (3) and (6) we can conclude that the cross-correlation function $R_{xy}(\tau)$ is a maximum when $\tau = \Delta$. That is, $$R_{xy}(\tau) \mid \tau = \Delta \geq R_{xy}(\tau) \forall \tau \qquad (7)$$

Equations (1) and (7) suggest the approach for determining the echo path round-trip delay, i.e., to form the cross-correlation function between the echo generating signal and the echo and then determine the point at which this cross-correlation function is first a maximum. This maximum point should correspond to the echo path delay.

Figure 2:
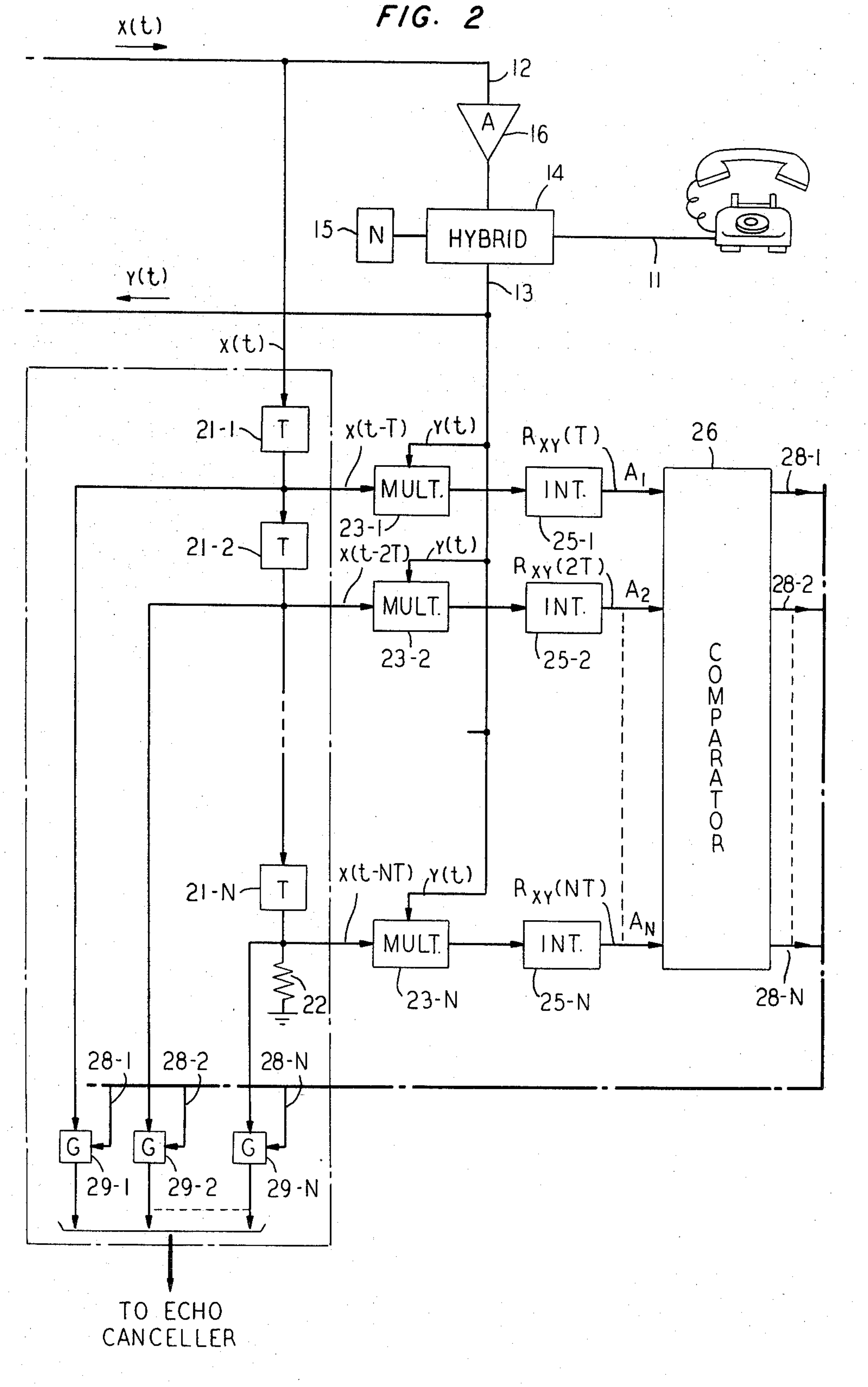
FIG. 2 is a detailed schematic block diagram illustrating the delay measuring circuit and variable delay device of FIG. 1.

The determination and simulation of the echo path delay can be carried out by the apparatus implementation illustrated in FIG. 2 of the drawings. The signal $x(t)$ in the incoming signal path 12 is delivered to a tapped delay line 21 having delay elements 21-1 through 21-N. Delay line 21 is suitably terminated by resistance 22. Each delay element of the delay line imparts a delay of T seconds equal to the Nyquist interval of 1/2B where B is the bandwidth of circuit 12 to 13 in Hertz. In a typical example in practice, each element of the delay line imparts a 1/10th millisecond delay (T) to the applied signal. Thus, exact replicas of the signal in circuit 12 are repeatedly available at 1/10th millisecond intervals, i.e., $x(t-T)$, $x(t-2T)$,...$x(t-NT)$. It will be appreciated by those skilled in the art that in accordance with Nyquist theory the value T can be less than a Nyquist interval, but this simply necessitates more taps and tap components than is really required. Accordingly, the value of T is preferably just equal to a Nyquist interval.

The individual signals produced at the taps of the delay line are multiplied with the echo $y(t)$ in the respective multiplier networks 23-1 through 23-N. Any of the circuits known in the analog computer art as four quadrant linear multipliers can be used to implement these networks. The multiplier output signals are then averaged in the respective integrator networks 25-1 through 25-N. The integration time of networks 25 should be of a duration of approximately 10 to 50 milliseconds, for example, and, as will be more evident hereinafter, this may vary somewhat depending upon the characteristics of the signal $x(t)$. In any event, this integration or averaging period is not particularly critical.

The integrator output signals $R_{xy}(T)$, $R_{xy}(2T)$...$R_{xy}(NT)$ comprise the cross-correlation function at times T, 2T...NT. And, as previously noted, the point at which this cross-correlation function is first a maximum corresponds to the round-trip delay of the echo path. Thus, the echo path delay is essentially equal to the delay associated with the tap whose output, $A_i$, has the largest magnitude of the numbers of the set $\{A_n\}$ shown in FIG. 2; $\{A_n = A_1, A_2 ... A_N\}$. The comparator 26 serves to compare the integrator output magnitudes $A_1, A_2 ... A_N$ and depending upon which is the largest the appropriate output lead 28-1, 28-2...28-N of the comparator will be energized. Circuits for carrying out such a comparison are well known in the art. The output leads 28-1, 28-2...28-N are respectively connected to the gates 29-1, 29-2...29-N so that one of the latter will be enabled when the comparator lead connected thereto is energized. The gates 29-1, 29-2...29-N are also connected to respective taps on the delay line 21, as indicated in FIG. 2

For the purpose of explaining the operation of the circuit of FIG. 2, let us assume that the echo path delay is equivalent in delay duration to two Nyquist intervals (i.e., $\Delta = 2T$). In accordance with the mathematical proof, supra, the output $A_2$ of the integrator 25-2 will, in this case, be of larger magnitude than any other output of the set $\{A_n\}$. The comparator 26 thus energizes the output lead 28-2 and the gate 29-2 is thereby enabled. Accordingly, the signal $x(t)$ will be delayed in the delay line 21 for a period of two Nyquist intervals and then read out therefrom via the enabled gate 29-2. This signal, $x(t-2T)$, is then delivered to the adaptive echo canceller 18. Thus, the incoming signal $x(t)$ is delayed in the delay line 21 by an amount equal to the echo path delay.

The tapped delay line 21, the multiplier and integrator tap components 23 and 25, and the comparator 26 together comprise the delay measuring circuit 20 of FIG. 1. And, as just explained, the tapped delay line 21 and gates 29 function as the variable delay device 17. Thus, the delay line 21 has, in this instance, a dual purpose.

A delay simulator, such as shown in detail in FIG. 2, can be provided for each echo canceller and it will improve the canceller's stability and noise performance. But, it will be apparent that the overall savings in circuit apparatus will not be significant. However, since the delay measuring circuitry of FIG. 2 is required by an echo canceller for only a very short time at the beginning of each connection, it may be time-shared over many echo cancellers. This will result in substantial savings in circuitry and in economy. Such time-sharing is symbolically illustrated in FIG. 1 by the ganged, single-pole, single-throw switches 10. At the instant a telephone connection is first established, the delay measuring circuit 20 is connected in shunt to the echo path. The path of the series-connected delay device 17 and echo canceller 18 is temporarily opened at this time. After the echo path delay is measured and the variable delay device set, all in the manner heretofore described, the delay measuring circuit 20 is disconnected and can then be used to measure the echo path delay of another and different telephone connection. The series-connected delay device 17 and canceller 18 are now connected across the echo path and they remain so connected for the duration of the call. The time required to measure the echo path delay and set the variable delay device is primarily determined by, and hence approximately equal to, the integration time of integrator networks 25. Thus, it will be apparent that the delay simulation operation can be readily carried out between the time a connection is first established and the first arrival of speech.

In the time-sharing arrangement described above, a variable delay device, comprising a tapped delay line and tap gates, will typically be provided on a one-for-one basis with each echo canceller. Any delay device known in the art (e.g., electromagnetic or acoustic) can be utilized for this purpose and the respective tap gates may comprise any one of a number of known electronic gating configurations. The tapped delay line and tap gates are not sophisticated in function and thus can be of inexpensive design.

It should be evident to those in the art that the variable delay device 17 could also be implemented digitally. For example, the signal $x(t)$ could be A/D (analog-to-digital) converted, stored for the desired time period in plural shift registers, read out from the latter via gates, and then D/A converted prior to delivery of the signal to the echo canceller. Such a digital implementation can be advantageously carried out, at low cost, in accordance with integrated circuit techniques. Further, if a pool of such shift registers and A/D and D/A converters are provided at a central office, the same may also be used on a shared basis between many echo cancellers.

The principles of the present invention do not depend on the echo generating signal and the choice of the same is completely arbitrary. That is, the input signal $x(t)$ can be incoming speech, random noise, an impulse, et cetera. In fact, the present invention can be quite advantageously used in combination with the impulse interrogation technique of my copending application, cited above. In the latter case, the echo path is interrogated with an impulse immediately after a connection is established. This impulse can also be utilized herein for the purpose of simulating the echo path delay.

Figure 3:
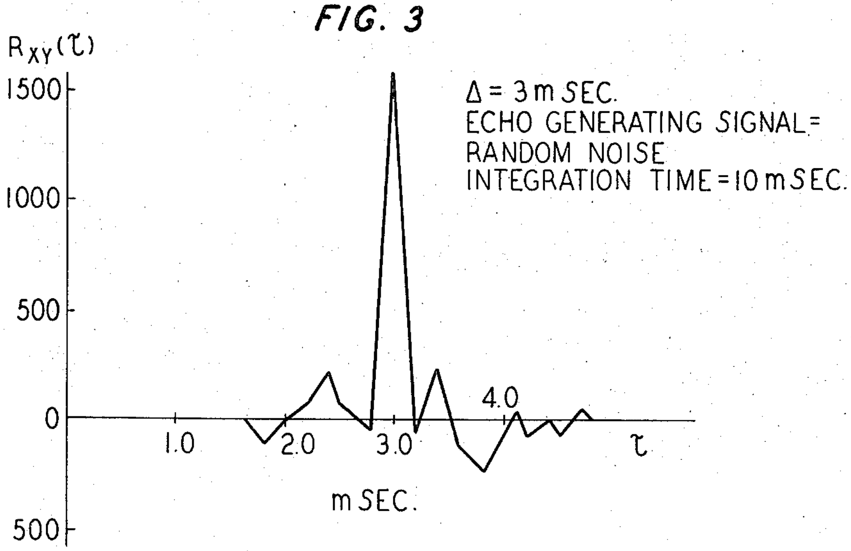
FIGS. 3 through 5 show the results of several tests conducted to verify the principles of the present invention.
Figure 4:
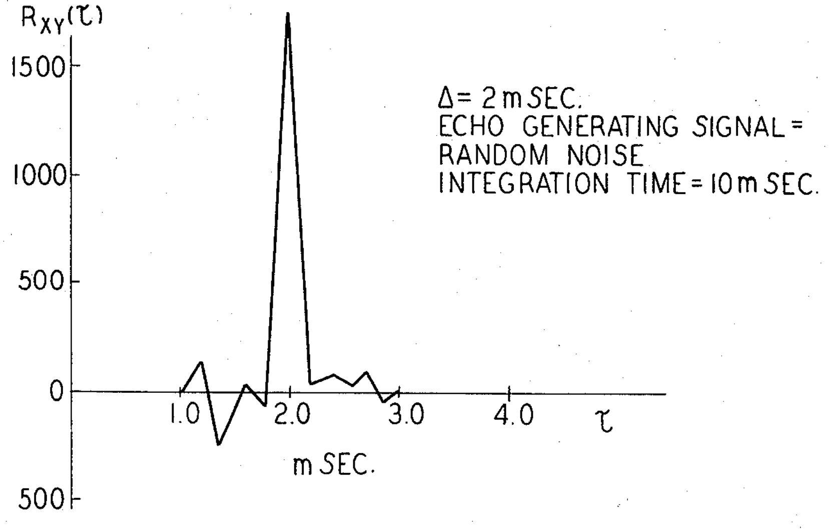
Figure 5:
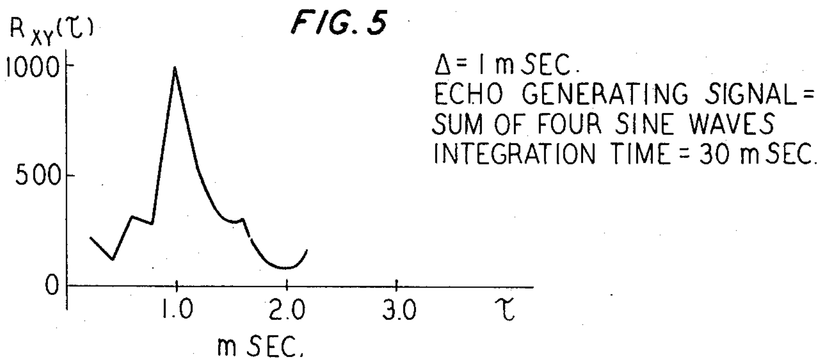

FIGS. 3 through 5 show the results of several tests conducted to verify the validity of the present inventive concept. The echo path was simulated in each case, but the impulse response of the same was fairly typical of echo paths encountered in practice. For purposes of simplicity, the echo path round-trip delay (Δ) was, in each case, less than that normally encountered. The legend accompanying each figure is believed self-explanatory. In FIG. 5, the echo generating signal $x(t)$ comprised the sum of four sine waves, i.e., $x(t) = \sin 200\pi t + \sin 600\pi t + \sin 2000\pi t + \sin 4000\pi t$.

As can be seen from FIGS. 3–5, for the cases tested the maximum of $R_{xy}(\tau)$ always occurred at $\tau = \Delta$. Also, it was found that $R_{xy}(\tau)$ could be approximated by very short integration times, 10 msec. for the case when the input was random and 30 msec. with the input given by the equation immediately above.

From the foregoing description it will be apparent at this point that various modifications or alterations may be devised by those skilled in the art without departing from the spirit and scope of the invention.

What is claimed is:

1. Echo cancelling apparatus comprising a variable delay device and an adaptive echo canceller connected in series across the echo path of a four-to-two wire junction, means bridging the echo path and serving to form the cross-correlation function between an incoming signal to the same and its echo, means for determining the point at which the cross-correlation function is first a maximum, and means operative in response to the determination of the last-recited means to control the variable delay device to achieve a delay therein substantially equal to the echo path delay.

2. In echo cancellation apparatus which includes a variable delay device and an adaptive echo canceller connected in series across the echo path of a four-to-two wire junction, said cancellation apparatus being characterized by means bridging the echo path and serving to form the cross-correlation function between an incoming signal to the echo path and its echo, means for determining the point at which the cross-correlation function is first a maximum, and means coupled to the determining means for controlling the variable delay device to achieve a delay therein substantially equal to the echo path delay.

3. In echo cancellation apparatus which includes a delay device and an adaptive echo canceller series coupled across the echo path of a four-to-two wire junction, said cancellation apparatus being characterized by means for measuring the delay between an input signal to the echo path and the return echo signal and producing a signal for controlling the delay of said delay device in accordance therewith, the delay measuring means comprising a tapped delay line, means coupling said input signal to the tapped delay line, said delay line having a plurality of output taps with a delay between successive taps of T seconds, means for respectively multiplying the signals at the respective delay line taps with the echo signal, means for respectively integrating the product signals of the multiplying means over a predetermined period of time, and comparison means for determining the maximum of the integrated product signals, said maximum corresponding to the delay in said echo path.

4. Echo cancellation apparatus as defined in claim 3 including means operative in response to the aforementioned maximum determination to control said delay device so as to provide a delay therein substantially equal to the echo path delay.

5. Echo cancellation apparatus as defined in claim 4 wherein the tap delay T is equal to the Nyquist interval.

6. Echo cancellation apparatus as defined in claim 5 wherein said delay measuring means is time-shared between a plurality of echo cancellers.

7. A method for measuring the delay between the input signal $x(t)$ to an echo path and the return echo signal $y(t)$ comprising the steps of delaying the input signal in increments of T so as to produce the delayed replicas $x(t-T)$, $x(t-2T)$...$x(t-NT)$, multiplying each of the replicas with the echo $y(t)$, integrating the respective product signals of the respective multiplications over a predetermined period of time, and determining the maximum of the integrated product signals, said maximum corresponding to the delay of said echo path.

8. The method as defined in claim 7 wherein T is equal to the Nyquist interval of $1/2B$ where $B$ is the bandwidth of the echo path in Hertz.

* * * * *